July 20, 1937.  H. C. LORD  2,087,648
METHOD AND APPARATUS FOR TREATING FOODS THROUGH HEAT EXCHANGE
Filed March 15, 1934   2 Sheets-Sheet 1
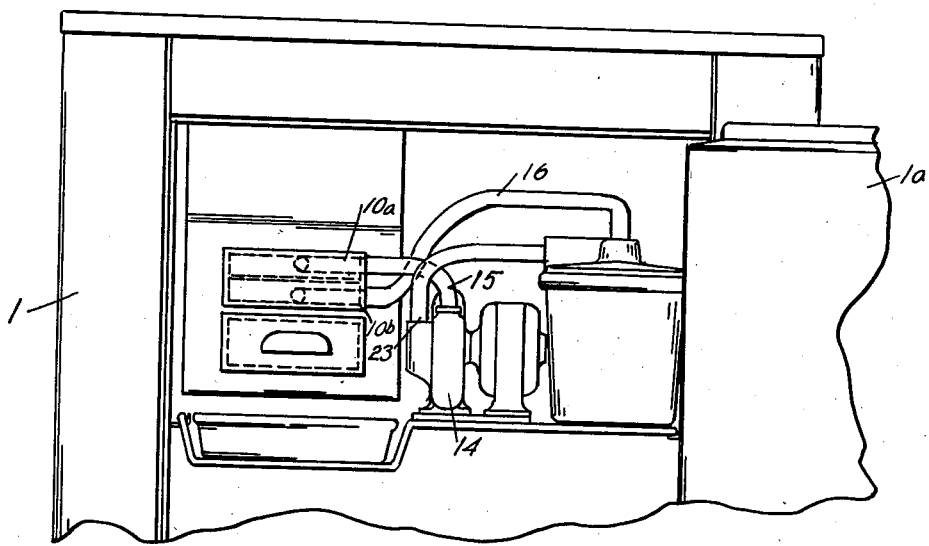
FIG. 1.
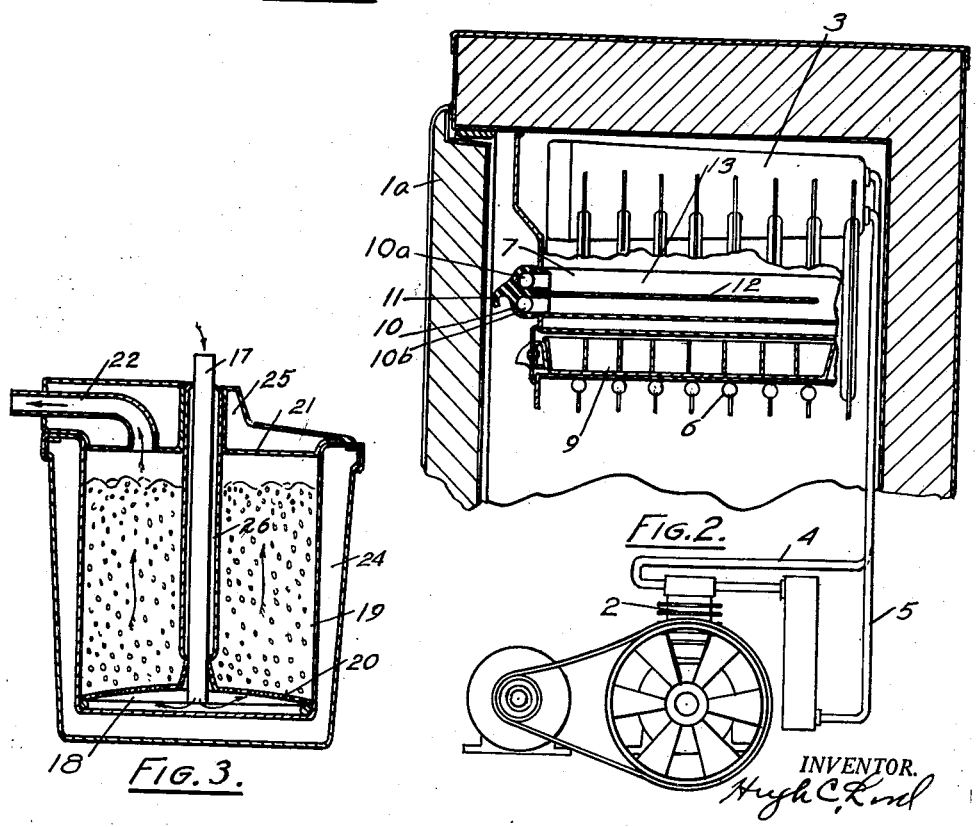
FIG. 2.
FIG. 3.
INVENTOR.
Hugh C. Lord INVENTOR.
Hugh C. Lord Patented July 20, 1937

2,087,648

UNITED STATES PATENT OFFICE 2,087,648

METHOD AND APPARATUS FOR TREATING FOODS THROUGH HEAT EXCHANGE

Hugh C. Lord, Erie, Pa.

Application March 15, 1934, Serial No. 715,695

5 Claims. (Cl. 62—114)

In the treatment of many foods, particularly frozen foods, such as ice cream, and sherbets, it is desirable to agitate the material as it is frozen giving to the food a lighter texture than a solid mass. It is desirable to have this grain, or texture, rather fine, but uniform and the present invention is designed to accomplish this purpose. In carrying out the invention air is driven by a pump past a cooling device, chilling the air. The air is then led to the bottom of a receptacle containing the liquid, or material being frozen and discharged in streams distributed throughout the mass, the air preferably expanding in the liquid agitating the liquid as it passes through it and chilling the liquid through its contact. Preferably the air is maintained in a closed circuit and is returned to the intake of the pump driving the air.

In carrying out the invention a preferable arrangement is to place the receptacle carrying the material to be treated in a chamber, the chamber itself being cooled so that the material may be pre-cooled, if convenient, the apparatus and process operating upon the material while maintained in the chamber. Thus the heat loss is reduced and particularly it adapts the method for use in an ordinary electric refrigerator. Features and details of the invention will appear from the specification and claims.

A preferable exemplification of the invention is illustrated in the accompanying drawings as follows:—

Fig. 1 shows the apparatus installed in a refrigerator.

Fig. 2 a sectional view through the cooling apparatus of the refrigerator.

Fig. 3 a freezing receptacle.

Figure 4:
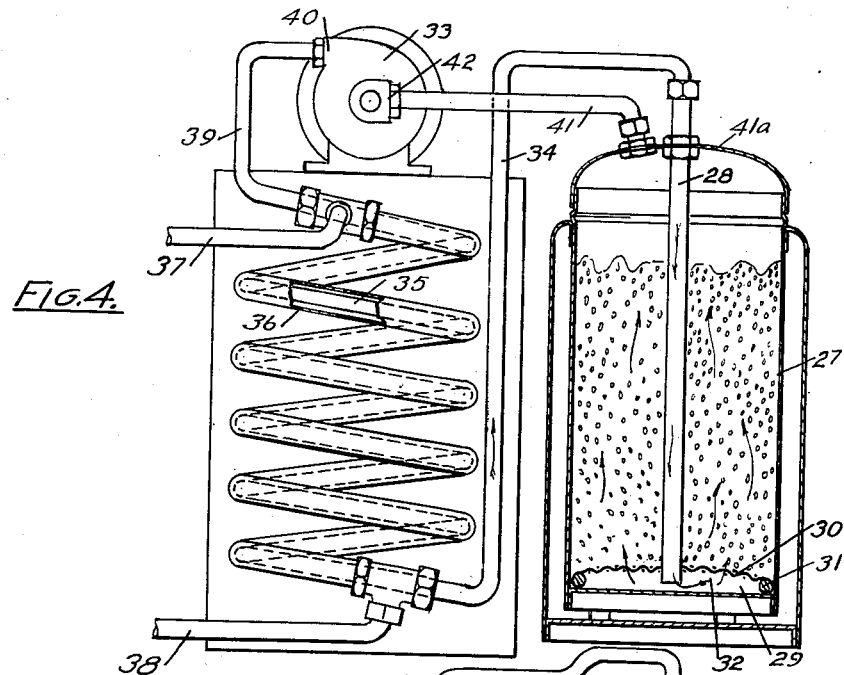

Fig. 4 a sectional view through a modification of an apparatus connected with the ordinary cooling coil.

Figure 5:
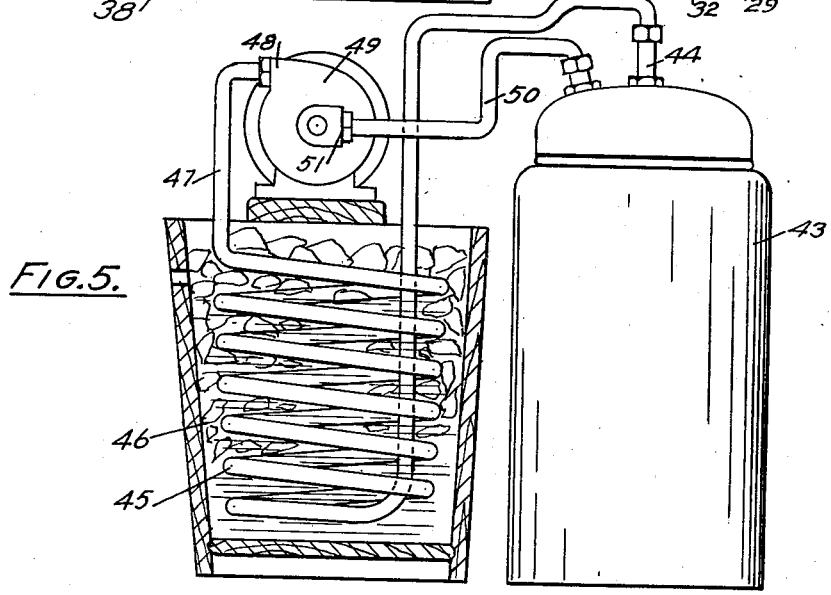

Fig. 5 a side elevation, partly in section, of a cooling scheme utilizing ice as the cooling medium.

In the modification of Figs. 1 to 3, 1 marks a refrigerator, 2 an ice machine, 3 an expansion chamber, 4 and 5 connections between the compressor of the ice machine and the expansion chamber, 6 cooling coils, 7 a pocket, or chamber for a freezing tray, 8 a similar chamber for a freezing tray 9 therein. The pocket 7 is sealed by a plug 10, preferably of rubber, having an inlet passage 10a, an outlet passage 10b, and a projection 11 engaging the door 1a of the refrigerator so as to maintain it in place. A baffle 12 is arranged in the pocket 7 forming a circuitous passage 13 through the pocket and affording an extended cooling, or heat exchange surface. A pump or blower 14 has a discharge 15 leading to the inlet 10a of the pocket 7 and the outlet and the discharge 10b of the pocket is connected by a pipe 16 with a tube 17 leading to a distributing chamber 18 at the bottom of a receptacle 19, the receptacle containing the material to be treated. The upper wall of the chamber 18, as shown in Fig. 3, is a perforated plate 20. The receptacle has a cover 21 through which a discharge pipe 22 leads to the intake 23 of the pump. The receptacle is practically insulated by an air chamber 24 and the cover also is preferably provided with an air chamber 25. The tube 17 is also preferably insulated by a chamber 26.

In the operation of the device, the liquid is placed in the receptacle and air is driven from the pump through the cooling pocket cooling it to a freezing temperature. It is then carried into the distributing chamber and discharged in streams through the material, thus agitating and chilling the material and as the heat loss is to the material gradually freezing it. It will be understood that the air passing through the pocket 7 has whatever heat there may be of compression so that there is a readier heat exchange at this point and that the air passing through the liquid is expanding so that there is a greater chilling effect through this expansion although the invention in its broader form is not limited to this arrangement. In the preferred manner of using this the food is prepared, placed in the refrigerator with the cover removed, taking on eventually the temperature of the refrigerator. Some time before it is desired to use the food, the cover is applied and the air movement started. The higher the velocity of the air, the more general its distribution and the slower the freezing, the finer the grain of the frozen material will be.

In the structure shown in Fig. 4 substantially the same part of the method is practiced. The apparatus involves a receptacle 27 having an inlet tube 28 leading to an air chamber 29. A wire gauze 30 serves to distribute the air. This is carried by a ring 31 and the ring is held in place by arms 32 extending from the tube 28. Air is forced by a pump 33, the system involving a pipe 34 leading to a pipe 38 from a coil 35. The cooling coil 35 is carried within a coil 36 connected by the pipes 37 and 38 with a source of cooling medium, such as brine. The intake of the cooling coil 35 is connected by a pipe 39 with a discharge 40 of the pump 33 and a discharge pipe 41 leads from the cover 41a of the receptacle to an intake 42 of the pump.

The operation in general is similar to that of the modification shown in Fig. 1.

A slightly different arrangement is indicated in Fig. 5. Here a receptacle 43 similar to that shown in Fig. 4 is used. An intake pipe 44 is connected with a coil 45 which is arranged in a receptacle 46 adapted to carry a cooling liquid. The intake of the coil 45 is connected by a pipe 47 with the discharge 48 of a pump 49. A return pipe 50 leads from the receptacle to an intake 51 of the pump, completing the circuit.

What I claim as new is:—

1. A method of forming frozen foods which consists in forcing a gas uniformly through the cross-section of the food mass in closely adjacent streams distributed through the food mass and at a freezing temperature, agitating the mass through the action of the gas alone and gradually freezing the mass as it is agitated by the passage of the gas.

2. The method of treating food materials which consists in holding the material in a receptacle in a chamber having a gas media in heat exchange relation to a temperature varying instrument and forcing a gas in heat transfering relation to the instrument uniformly through the cross-section of the food material in the receptacle in closely adjacent streams distributed through the food in the receptacle, changing the form of the material through heat exchange and agitation by the gas alone, thereby gradually freezing the material as it is agitated by the passage of the gas.

3. The method of treating food material which consists in holding the material in a receptacle in a chamber having a gas media in heat exchange relation to a temperature varying instrument, forcing the gas uniformly through the cross-section of the material in closely adjacent streams distributed through the material, agitating the material through the action of the gas alone, and varying the temperature of the food material, returning the gas in the circuit and subjecting it to a temperature which is introduced by the temperature varying instrument.

4. The method of freezing food material which consists in holding the material in a receptacle and in a refrigerator having a media in the refrigerator chilled by a chilling instrument, circulating a gas in chilling relation with the instrument uniformly through the cross-section of the material in closely adjacent streams distributed through the material with sufficient intensity to agitate the mass through the action of the gas alone and withdrawing the gas as it leaves the material and reforcing it through the circuit.

5. In a congelation apparatus a receptacle adapted to hold a mass to be congealed, means for cooling a gas, a closed circuit between said means and said receptacle, a gas circulating means, means for distributing said gas through the mass to be congealed in the receptacle uniformly throughout the cross-section of the said mass.

H. C. LORD.